(12) United States Patent
Eldar

(10) Patent No.: US 7,263,685 B2
(45) Date of Patent: Aug. 28, 2007

(54) SYNCHRONIZING USE OF A DEVICE BY MULTIPLE SOFTWARE COMPONENTS IN ACCORDANCE WITH INFORMATION STORED AT THE DEVICE

(75) Inventor: Avigdor Eldar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 10/661,321

(22) Filed: Sep. 12, 2003

(65) Prior Publication Data

US 2005/0060723 A1   Mar. 17, 2005

(51) Int. Cl.
*G06F 9/44* (2006.01)
*G06F 9/45* (2006.01)

(52) U.S. Cl. .................. 717/101; 717/120; 717/136

(58) Field of Classification Search ............. 717/101, 717/120–122, 127–130, 106–108; 713/150, 713/193
See application file for complete search history.

(56) References Cited

U.S. PATENT DOCUMENTS

| | | | | |
|---|---|---|---|---|
| 5,826,081 | A * | 10/1998 | Zolnowsky | 718/103 |
| 5,913,043 | A * | 6/1999 | Carter et al. | 710/100 |
| 6,081,864 | A * | 6/2000 | Lowe et al. | 710/100 |
| 6,134,660 | A * | 10/2000 | Boneh et al. | 713/193 |
| 6,578,146 | B2 * | 6/2003 | Johnson | 713/189 |
| 6,839,843 | B1 * | 1/2005 | Bacha et al. | 713/176 |
| 6,877,088 | B2 * | 4/2005 | Dice | 712/235 |
| 7,010,624 | B1 * | 3/2006 | Zhou et al. | 710/8 |
| 7,076,769 | B2 * | 7/2006 | Baraz | 717/136 |
| 7,082,598 | B1 * | 7/2006 | Le et al. | 717/127 |
| 7,107,460 | B2 * | 9/2006 | Cromer et al. | 713/193 |
| 7,177,782 | B2 * | 2/2007 | Falik et al. | 702/189 |
| 7,200,745 | B2 * | 4/2007 | Schwartz et al. | 713/1 |

OTHER PUBLICATIONS

Santoro et al, PCI DMA/CPU handoff for increased effectiveness of checkpointing functionalities in CCL, IEEE DSRT, pp. 120-127, 2003.*
Alimonti et al, "Pomone a PCI based data acquistion system", IEEE, pp. 1677-1679, 2004.*
Robinson, "Using I2O and I/O Processors in embadded PCI systems", IEEE, pp. 204-209, 1998.*
Ball et al, "Through static analysis of device drivers", ACM EuroSys, pp. 73-85, 2006.*

* cited by examiner

*Primary Examiner*—Anil Khatri
(74) *Attorney, Agent, or Firm*—Buckley, Maschoff & Talwalker LLC

(57) ABSTRACT

According to some embodiments, a method is directed to determining via a plurality of flags stored at a PCI device that the PCI device is to perform a first function. The PCI device is shared with a first software component associated with the first function and a second software component associated with a second function, and the plurality of flags comprise a first component flag to indicate free or busy, a second component flag to indicate free or busy, and a turn flag to indicate the first component or the second component. The method further discloses setting the first component flag to busy, setting the turn flag to first component, and performing the first function when the second software component is not using the PCI device. The first function may access the PCI device if either the second component flag is set to free or if the turn flag is set to first component.

26 Claims, 6 Drawing Sheets

SYNCHRONIZING USE OF A DEVICE BY MULTIPLE SOFTWARE COMPONENTS IN ACCORDANCE WITH INFORMATION STORED AT THE DEVICE

BACKGROUND

Although multiple software components might be able to use a single device, in some cases the device should only be controlled by one software component at any given time. For example, in some circumstances a first software component might access a network processor to exchange information using a secure network protocol while at other times a second component uses the network processor as a general encryption and/or decryption engine. As a result, before using a device a software component might attempt to make sure that no other software component is currently using that device.

DETAILED DESCRIPTION

Figure 1:
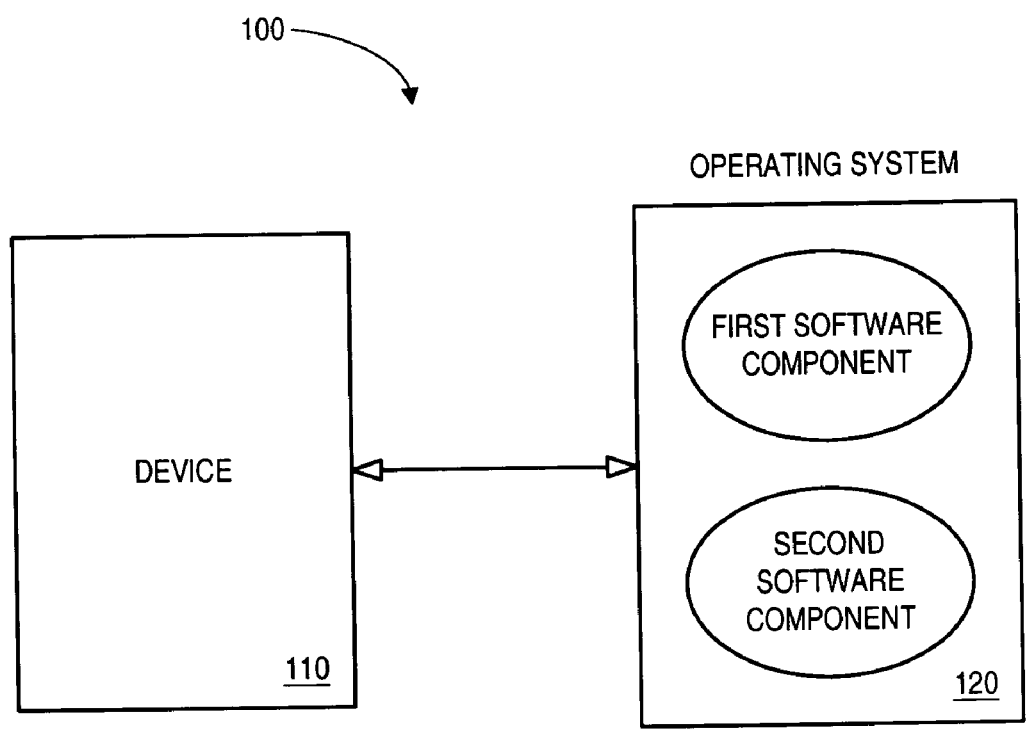
FIG. 1 is a block diagram of a system.

Multiple software components may use a single device. For example, FIG. 1 is a block diagram of a system 100 that includes an operating system 120, such as an operating system executing at an INTEL® PENTIUM® 4 processor. A first and second software component residing in the operating system 120 logic space can each use a single device 110. Moreover, the device 110 should only be used by one of the software components at any given time. Thus, before using the device 110 the first software component might attempt to make sure that the second software component is not currently using the device 110.

To facilitate this process, a "synchronization object" or "semaphore" might be used. For example, the two software components might use a shared host memory location accessible by the processor 100 to store an indication of whether or not the device is currently being used.

In some cases, however, the software components might not be able to exchange information using host memory (e.g., independent first and second software components might be unable to access a shared host memory location). For example, a Linux kernel or software components might reside in different virtual memory address regions (e.g., one in kernel space and the other in user space).

Figure 2:
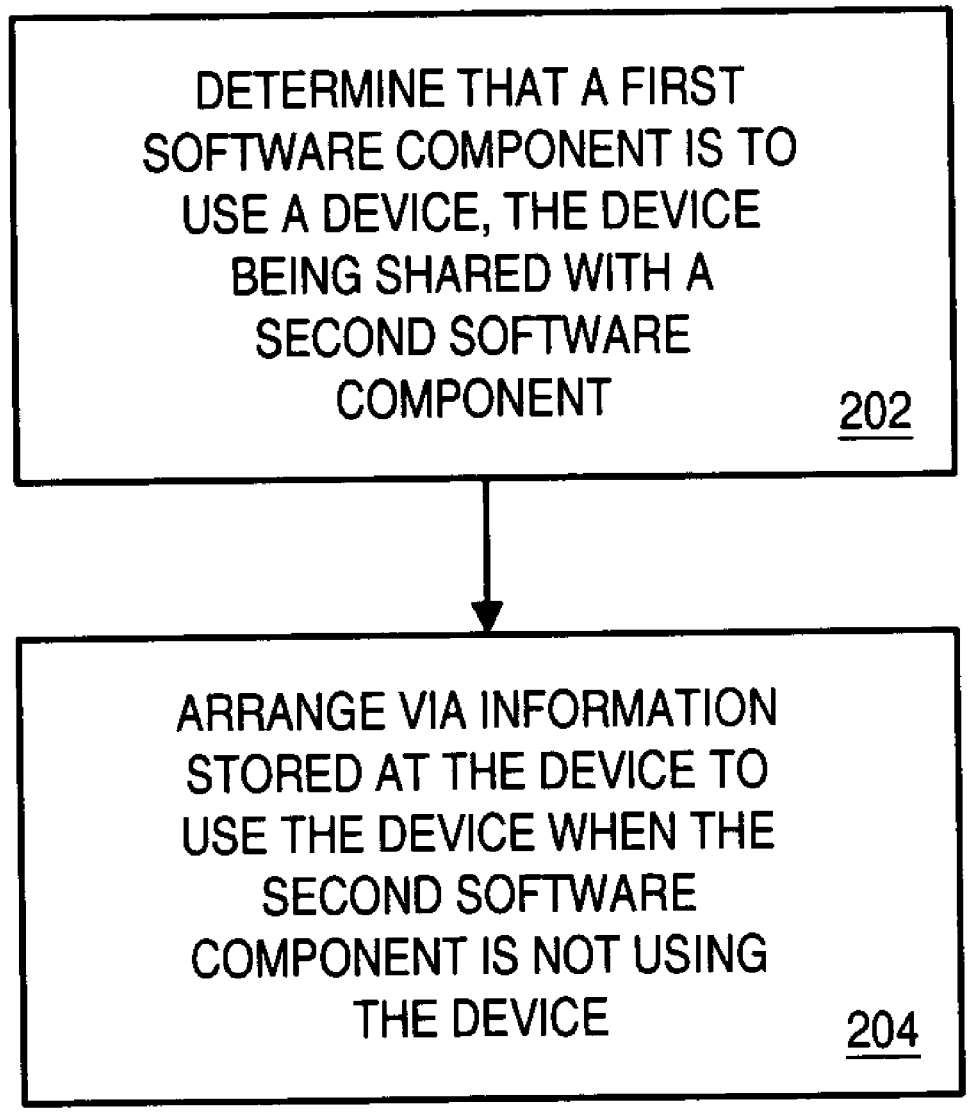
FIG. 2 is a flow chart of a method according to some embodiments.

FIG. 2 is a flow chart of a method according to some embodiments. The flow charts described herein do not necessarily imply a fixed order to the actions, and embodiments may be performed in any order that is practicable. The method of FIG. 2 may be associated with, for example, the first software component described with respect to FIG. 1. Note that any of the methods described herein may be performed by hardware, software (including microcode), or a combination of hardware and software. For example, a storage medium may store thereon instructions that when executed by a machine result in performance according to any of the embodiments described herein.

At 202, it is determined that a first software component is to use a device, the device being shared with a second software component. At 204, it is arranged via information stored at the device to use the device when the second software component is not using the device. That is, by storing a synchronization object, a semaphore, or other information to (and retrieving information from) the device before using the device, the first software component may check to make sure that no other software component is currently using the device.

Figure 3:
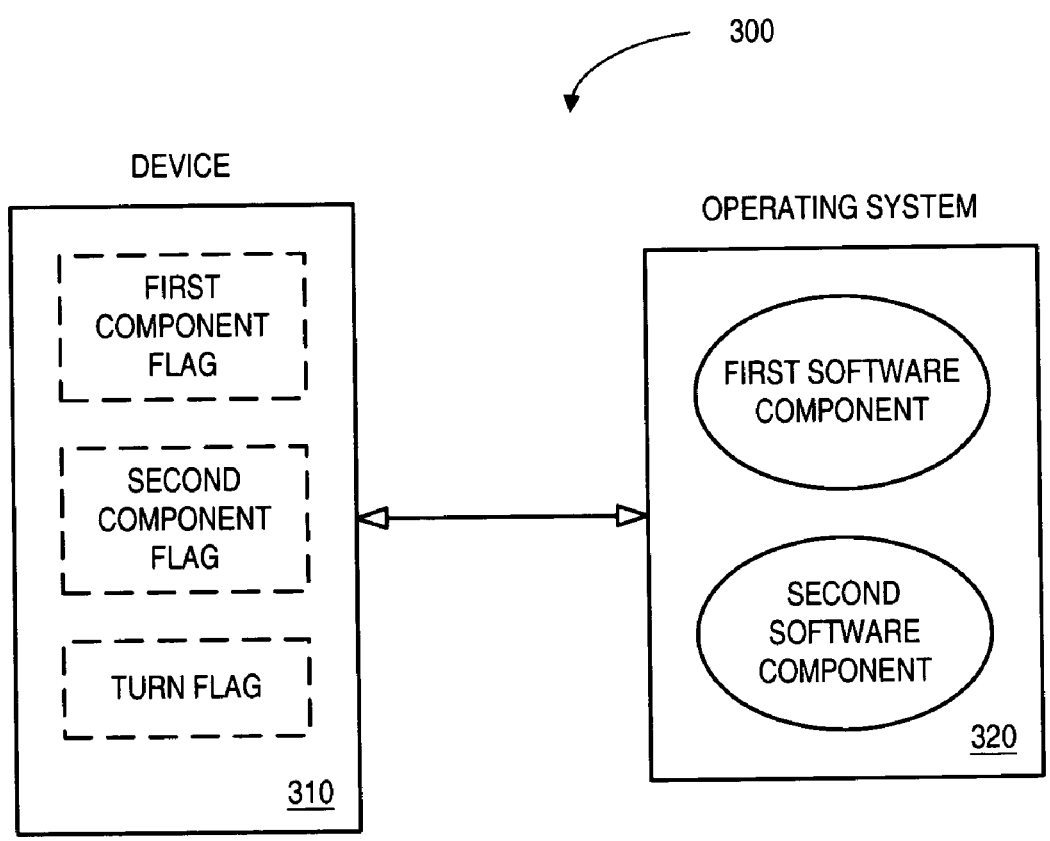
FIG. 3 is a block diagram of a system according to some embodiments.
Figure 4:
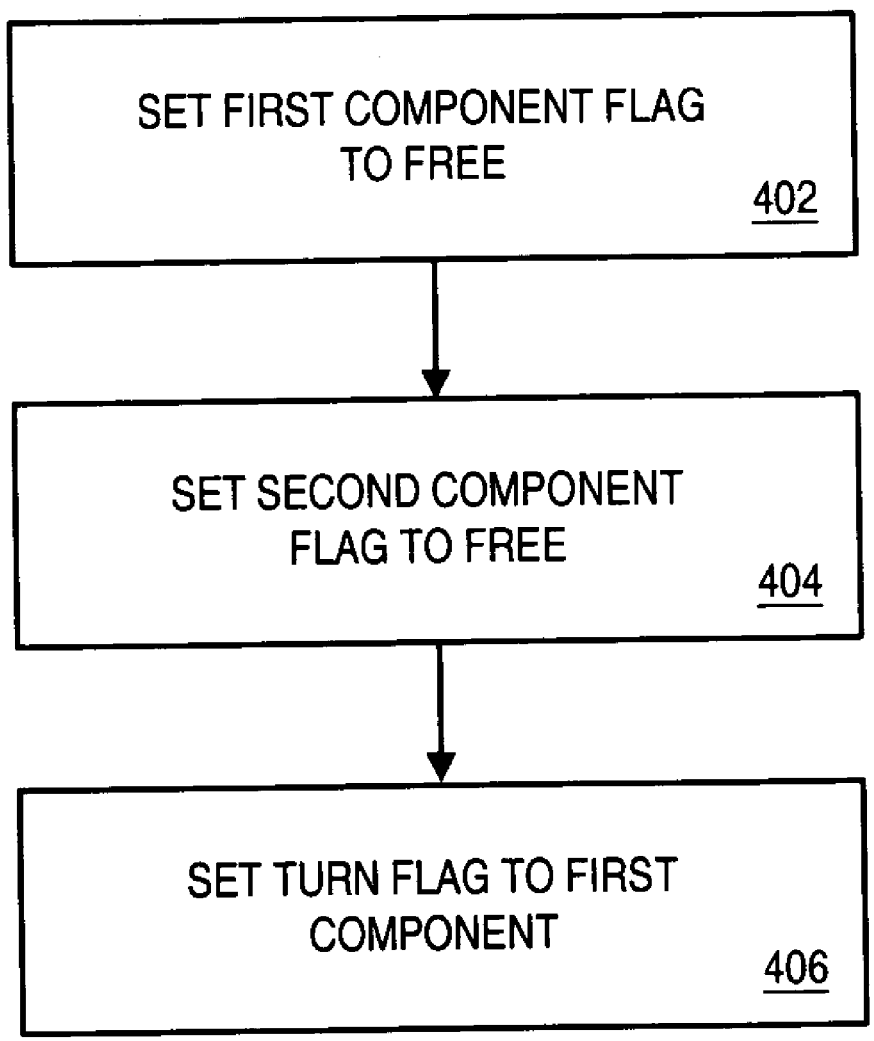
FIG. 4 is a flow chart of an initialization method according to some embodiments.
Figure 5:
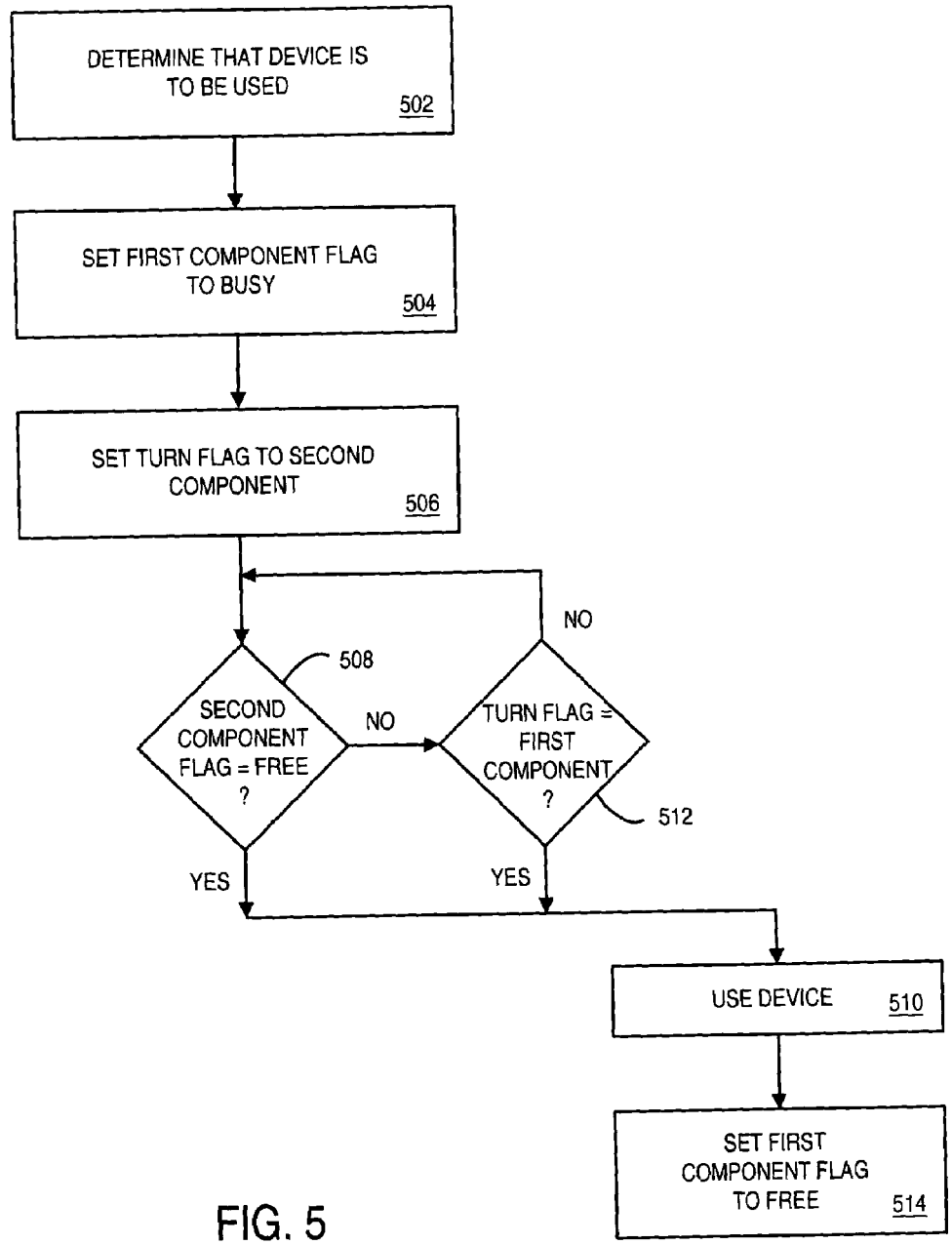
FIG. 5 is a flow chart of a software component method according to some embodiments.

A number of different techniques could be used to synchronize access to the device, and FIGS. 3 through 5 illustrate one such technique (referred to as "Peterson's Algorithm"). In particular, FIG. 3 is a block diagram of a system 300 in which two software components associated with an operating system 320 might need to use a single device 310 according to some embodiments. The software components may, for example, access the device 310 through an interface that operates in accordance with the Peripheral Component Interconnect (PCI) Standards Industry Group (SIG) standard entitled "Conventional PCI 2.2" or "PCI Express 1.0."

The device 310 could be for example, a network adapter that supports encryption and decryption acceleration in order to exchange IPsec information as defined by the Internet Engineering Task Force (IETF) Request For Comment (RFC) number 2401 entitled "Security Architecture for the Internet Protocol" (November 1998). In this case, the first software component might be a network driver and the second software component might be an encryption driver (e.g., to let the operating system 320 take advantage of the encryption and decryption acceleration).

As another example, the device 310 might be a network adapter that supports remote access, such as an adapter configured in accordance with the Distributed Management Task Force (DMTF) specification entitled "Alert Standard Format (ASF) Version 2.0" (April 2003). In this case, the first software component might be a network driver and the second software component might be a different driver that enables the adapter to act as an ASF alerting device (e.g., because different functionality might be exposed by each driver).

As still another example, the device 310 might be a PCI device that exposes an additional interface to a host bus that operates in accordance with the Smart Battery System (SBS) Implementer's Forum specification entitled "System Management Bus (SMBus) Version 2.0" (August 2000). In this case, one of the software components might be a driver associated with an SMBus controller.

As yet another example, the first software component might be a run-time driver for a peripheral device while the second software component is a diagnostic driver for the device (e.g., the run-time driver being used to exchange information with a PCI disk controller and the diagnostic driver being used to test the controller).

In accordance with Peterson's Algorithm (provided herein as only one example of a synchronization technique), three items of information may be stored at the device 310. In particular, a first component flag and a second component flag may each indicate either "free" or "busy." In addition, a turn flag may indicate either "first component" or "second component." The three items of information might be stored, for example, in registers at the device. According to some embodiments, the registers are "pre-fetchable" volatile memory (e.g., the software components may exchange information with the registers without adversely altering operation of the device 310).

FIG. 4 is a flow chart of an initialization method according to some embodiments. The method may be performed, for example, by the operating system 320 or the device 310. At 402, the first component flag is set to "free, and the second component flag is set to "free" at 404. At 406, the turn flag is set to "first component." According to other embodiments, the turn flag may instead be set to either "first component" or "second component" (e.g., on a random basis). The following is one pseudo-code representation of an initialization process that may be performed in connection with the Peterson's Algorithm:

```
flag: array[0..1] of Boolean;
turn: 0..1;
flag[0] = FALSE;
flag[1] = FALSE;
turn := random (0..1)
``` where flag[0] and flag [1] are the first and second component flags, respectively, and either may have a value of "FALSE" (indicating "free") or "TRUE" (indicating "busy"). Moreover, turn is the turn flag and may have a value of "0" (indicating "first component") or "1" (indicating "second component").

FIG. 5 is a flow chart of a software component method according to some embodiments. The method may be performed, for example, by the first software component described with respect to FIG. 3. At 502, it is determined that a device is to be used. For example, the first software component may determine that it needs to access a network adapter that can also be accessed by the second software component.

At 504, the first component flag is set to "busy," and the turn flag is set to "second component" at 506. The first software component then waits until either the second component flag indicates "free" (at 508) or the turn flag indicates "first component" (at 512). When either of these two conditions is met, the first software component may use the device at 510. After use of the device is completed, the first software component sets the first component flag to "free" (letting the second software component use the device if needed).

A method similar to that described with respect to FIG. 5 may be provided with respect to the second software component. The following is one pseudo-code representation of a software component process that may be performed in connection

```
entry protocol for software component i
repeat {
flag[i] := TRUE;
turn := j;
while (flag[j] and turn = j) do { };
[software component i code using the device]
exit protocol for software component i flag[i] := false;
``` where i=0 and j=1 when the code is executed by the first software component and i=1 and j=0 when the code is executed by the second software component. Note that accesses to the device 310 by the operating system 320 might comprise atomic operations (e.g., a PCI bus would make sure that two separate accesses are serialized).

Figure 6:
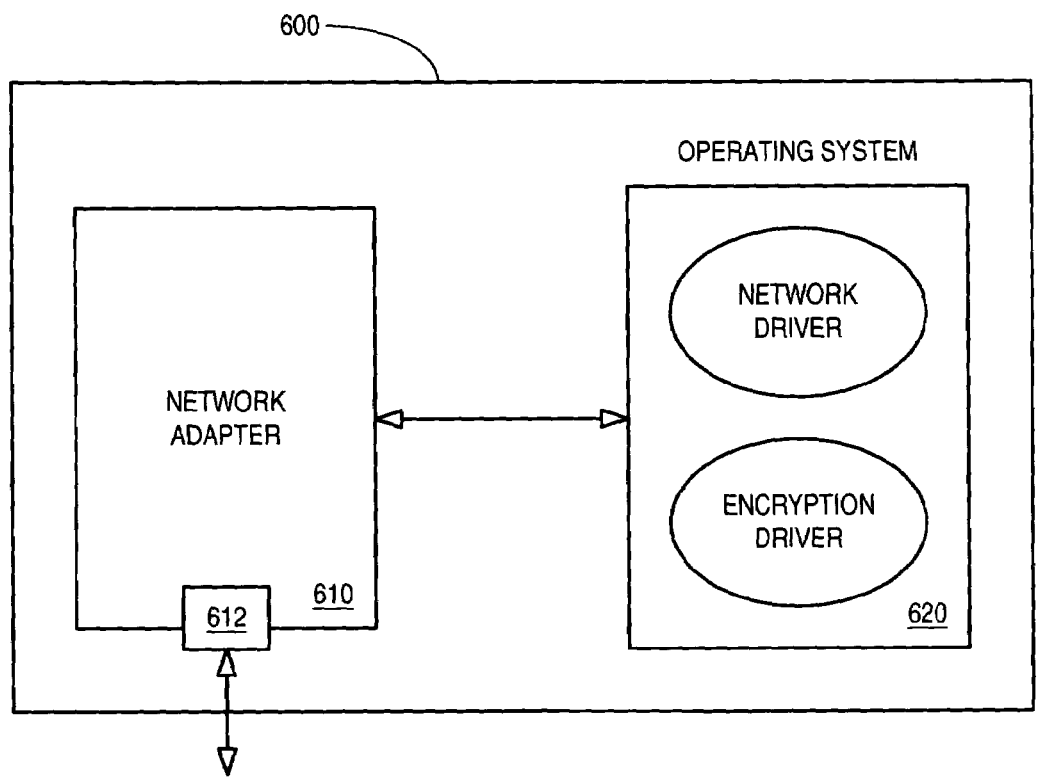
FIG. 6 is a block diagram of a system according to one embodiment.

FIG. 6 is a block diagram of a system 600 according to one embodiment. The system 600 may comprise, for example, a Personal Computer (PC), a server, a workstation, or a mobile processing device. The system 600 includes a network adapter 610 to exchange packets of information via a port 612 in accordance with the Fast Ethernet LAN transmission standard 802.3-2002® published by the Institute of Electrical and Electronics Engineers (IEEE). One example of such a network adapter 610 is the INTEL® PRO/1000 Gigabit Server Adapter. Moreover, the system 600 includes an operating system 620, and either a network driver or an encryption driver may use the network adapter 610 in accordance with any of the embodiments described herein. For example, information stored at the network adapter 610 could be used to make sure that the encryption driver does not access the network adapter 610 when it is currently being accessed by the network driver.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to the synchronization of two software components, embodiments may be used with respect to more than two software components (e.g., by using an additional register to store a third component flag and increasing the size of the turn flag register so that it able to store three different values).

In addition, although specific examples of devices and software components have been provided, embodiments may be used with respect to other types of devices and/or software components (e.g., associated with concurrent sequential software processes that compete for a finite resource). Similarly, embodiments are not limited to PCI devices. For example, synchronization may be provided for software components that access a device via an interface in accordance with the "Universal Serial Bus (USB) Specification Revision 2.0" (April 2000) available from the USB Implementers Forum.

Moreover, although some embodiments have been described with respect to Peterson's Algorithm, embodiments may use any other synchronization technique. Note that some synchronization techniques may provide determinism (e.g., the outputs are determined by the inputs), mutual exclusion (e.g., two software components will not access a device at the same time), progress (e.g., no software component is blocked except by another that is using, or waiting to use, a device), deadlock avoidance, bounded waiting (e.g., a theoretical limit on how long a software component may need to wait before accessing a device), and/or varying degrees of performance and fairness. Embodiments of the present invention, however, may include any combination of these characteristics (e.g., some embodiments might not provide completely bounded waiting). By way of example, Dekker's Algorithm could be used to synchronize use of a device by software components.

The several embodiments described herein are solely for the purpose of illustration. Persons skilled in the art will recognize from this description other embodiments may be practiced with modifications and alterations limited only by the claims.

What is claimed is:

1. A method, comprising:
   determining via a plurality of flags stored at a PCI device that the PCI device is to perform a first function, the PCI device being shared with a first software component associated with the first function and a second software component associated with a second function, wherein the plurality of flags comprise a first component flag to indicate free or busy, a second component flag to indicate free or busy, and a turn flag to indicate the first component or the second component;
   setting the first component flag to busy;
   setting the turn flag to first component; and
   performing the first function when the second software component is not using the PCI device,
   wherein the first function may access the PCI device if either the second component flag is set to free or if the turn flag is set to first component.

2. The method of claim 1, further comprising
   waiting until either the first component flag is set to free or the turn flag is set to second component before using the device; and
   performing the second function when the first software component is not using the PCI device.

3. The method of claim 2, wherein the first and second component flags are initialized to free.

4. The method of claim 3, further comprising:
   setting the first component flag to busy; and
   setting the turn flag to second component.

5. The method of claim 4, further comprising:
   waiting until either the second component flag is free or the turn flag is first component before using the device.

6. The method of claim 5, further comprising:
   setting the first component flag to free after using the device.

7. The method of claim 1, wherein said performing is in accordance with at least one of: (i) Dekker's algorithm, and (ii) Peterson's algorithm.

8. The method of claim 1, wherein the plurality of flags are stored using pre-fetchable storage registers at the device.

9. The method of claim 1, wherein at least one of the first and second software components comprise a device driver.

10. The method of claim 1, wherein the PCI device comprises at least one of: (i) a network adapter, and (ii) a disk controller.

11. The method of claim 1, wherein the PCI device comprises a network controller, the first software component comprises a network driver, and the second software component comprises an encryption driver.

12. The method of claim 1, wherein the first and second software components access the device via at least one of (i) a peripheral component interconnect bus and (ii) a universal serial bus.

13. An apparatus, comprising:
    a storage medium having stored thereon instructions that when executed by a machine result in the following:
    determining via a plurality of flags stored at a PCI device that the PCI device is to perform a first function, the PCI device being shared with a first software component associated with the first function and a second software component associated with a second function, wherein the plurality of flags comprise a first component flag to indicate free or busy, a second component flag to indicate free or busy, and a turn flag to indicate the first component or the second component;
    setting the first component flag to busy;
    setting the turn flag to first component; and
    performing the first function when the second software component is not using the PCI device,
    wherein the first function may access the PCI device if either the second component flag is set to free or if the turn flag is set to first component.

14. The apparatus of claim 13, wherein the instructions further result in:
    waiting until either the first component flag is set to free or the turn flag is set to second component before using the device; and
    performing the second function when the first software component is not using the PCI device.

15. The apparatus of claim 14, wherein the first and second component flags are initialized to free.

16. The apparatus of claim 15, wherein she instructions further result in:
    setting the first component flag to busy, and
    setting the turn flag to second component.

17. The apparatus of claim 16, wherein the instructions further result in:
    waiting until either the second component flag is free or the turn flag is first component one before using the device.

18. The apparatus of claim 17, wherein the instructions further result in:
    setting the first component flag to free after using the device.

19. The apparatus of claim 13, wherein said performing is in accordance with at least one of: (i) Dekker's algorithm, and (ii) Peterson's algorithm.

20. The apparatus of claim 13, wherein the plurality of registers are stored using pre-fetchable storage registers at the device.

21. The apparatus of claim 13, wherein at least one of the first and second software components comprise a device driver.

22. The apparatus of claim 13, wherein the PCI device comprises at least one of: (i) a network adapter, and (ii) a disk controller.

23. An apparatus, comprising:
    a processor;
    a bus interface, and
    a storage medium having stored thereon instructions that when executed by the processor result in the following:
    determining via a plurality of flags stored at a PCI device that the PCI device is to perform a first function , the PCI device being shared with a first software component associated with the first function and a second software component associated with a second function, wherein the plurality of flags comprise a first component flag to indicate free or busy, a second component flag to indicate free or busy, and a turn flag to indicate the first component or the second component;
    setting the first component flag to busy;
    setting the turn flag to first component; and
    performing the first function when the second software component is not using the PCI device,
    wherein the first function may access the PCI device if either the second component flag is set to free or if the turn flag is set to first component,
    wherein the plurality of flags are accessed via the bus interface.

24. The apparatus of claim 23, wherein the device comprises a peripheral device and the information is stored using pre-fetchable registers at the peripheral device.

25. A system, comprising:
   a processor;
   a network adapter;
   an Ethernet port coupled to the network adapter; and
   a storage medium having stored thereon instructions that when executed by the processor result in the following:
   determining via a plurality of flags stored at a PCI device that the PCI device is to perform a first function, the PCI device being shared with a first software component associated with the first function and a second software component associated with a second function, wherein the plurality of flags comprise a first component flag to indicate free or busy, a second component flag to indicate free or busy, and a turn flag to indicate the first component or the second component;
   setting the first component flag to busy;
   setting the turn flag to first component; and
   performing the first function when the second software component is not using the PCI device,
   wherein the first function may access the PCI device if either the second component flag is set to free or if the turn flag is set to first component.

26. The system of claim 25, wherein the first software component comprises a network driver and the second software component comprises an encryption driver.

* * * * *